(12) United States Patent
Mock et al.

(10) Patent No.: US 8,369,489 B2
(45) Date of Patent: Feb. 5, 2013

(54) USER INTERFACE THAT REFLECTS SOCIAL ATTRIBUTES IN USER NOTIFICATIONS

(75) Inventors: Von A. Mock, Boynton Beach, FL (US); Mark A. Barros, Wellington, FL (US); Daniel A. Baudino, Lake Worth, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1100 days.

(21) Appl. No.: 11/537,289

(22) Filed: Sep. 29, 2006

(65) Prior Publication Data

US 2008/0080700 A1 Apr. 3, 2008

(51) Int. Cl.
*H04M 1/64* (2006.01)

(52) U.S. Cl. .......................................... 379/68

(58) Field of Classification Search ...................... 379/68
See application file for complete search history.

(56) References Cited

U.S. PATENT DOCUMENTS

| | | | | |
|---|---|---|---|---|
| 6,961,410 | B1 * | 11/2005 | Castagna | 379/88.23 |
| 7,103,548 | B2 * | 9/2006 | Squibbs et al. | 704/260 |
| 7,123,696 | B2 * | 10/2006 | Lowe | 379/88.16 |
| 2005/0057357 | A1 | 3/2005 | Helal et al. | |
| 2005/0169446 | A1 | 8/2005 | Randall et al. | |
| 2006/0106612 | A1 | 5/2006 | Surace et al. | |
| 2006/0143569 | A1 | 6/2006 | Kinsella et al. | |
| 2006/0145944 | A1 | 7/2006 | Tarlton et al. | |

FOREIGN PATENT DOCUMENTS

WO WO0239424 A1 5/2002

OTHER PUBLICATIONS

Your Voice Reminder software information, http://www.friendly-ware.com/yvr/, 2 pgs.
Your-voice Time-reminder, http://www.friendly-ware.com/yvr/YourVoiceTimeReminder.html, 1 pg.
International Search Report, PCT (Patent Cooperation Treaty), International Application No. PCT/US 07/76964, International Filing Date: Aug. 28, 2007, Priority Date: Sep. 29, 2006, 6 pages.

* cited by examiner

*Primary Examiner* — Alexander Jamal

(57) ABSTRACT

A method (300) for providing an audio message (105). The method can include detecting at least one external parameter (125, 130, 135). Detecting the external parameter can include detecting a time, a location or a station identifier. Detecting the location can include receiving a signal from a network node (110) or a beacon (115), or receiving location information from a positioning system (240). In one arrangement, detecting the external parameter can include detecting a plurality of identifiers, such as a time, a location and/or a station identifier. The external parameter can be processed to identify at least one audio attribute (265) associated with a voice persona. An audio message then can be generated based, at least in part, on the audio attribute. Identifying the audio attribute can include identifying at least a second audio attribute associated with a background sound.

17 Claims, 2 Drawing Sheets

USER INTERFACE THAT REFLECTS SOCIAL ATTRIBUTES IN USER NOTIFICATIONS

BACKGROUND OF THE INVENTION

1. Field of the Invention

The present invention generally relates to user interfaces and, more particularly, to user interface notifications.

2. Background of the Invention

With the advent of modern processing systems, the use of calendaring programs has become common both in the work place and for personal use. Such calendaring programs are available on personal computers, mobile stations (e.g. mobile telephones and personal digital assistants), and even over the Internet. A typical calendaring program presents a calendar on a display using a graphical user interface (GUI), and receives user inputs to enter calendar entries. For example, a user may, via the GUI, select a particular time on a particular day and enter a task for which the user wishes to be reminded. The user also can select a time when he wishes to be reminded of the task. For instance, the user can choose to be reminded of the task 15 minutes before the time at which the task is scheduled, 1 hour before such time, a day before such time, etc.

At the selected reminder time, a typical calendaring program can present a reminder message to the user. For example, the calendaring program can present the message in the GUI, or present the message as an audio signal. The audio signal that is presented can be user selectable. For instance, when generating the calendar entry, the user may select an audio file that consists of a sound of a ringing bell, and such sound can be played at the appropriate reminder time.

SUMMARY OF THE INVENTION

The present invention relates to a method for providing an audio message. The method can include detecting at least one external parameter. Detecting the external parameter can include detecting a time, a location, a station identifier or a biometric parameter. Detecting the location can include receiving a signal from a network node or a beacon, or receiving location information from a positioning system. In one arrangement, detecting the external parameter can include detecting a plurality of parameters.

The external parameter can be processed to identify at least one audio attribute associated with a voice persona. An audio message then can be generated based, at least in part, on the audio attribute. Identifying the audio attribute also can include identifying at least a second audio attribute associated with a background sound. Further, the method can include receiving an audio message indicator from a calendaring program.

The present invention also relates to a device for providing an audio message. The device can include a clock that detects at least one external parameter and a processor that processes the external parameter to identify at least one audio attribute associated with a voice persona. The processor also can identify at least a second audio attribute associated with a background sound. In one arrangement, the processor also can receive an audio message indicator from a calendaring program. Further, the device can include an output audio transducer that presents an audio message generated based on, at least in part, the audio attribute.

The device also can include a positioning system that detects at least a second external parameter. Further, the device can include a communications adapter that detects at least a second external parameter from a network node, a beacon or a mobile station. A biometric sensor also can be provided with the device. The biometric sensor can detect at least a second external parameter.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

Figure 1:
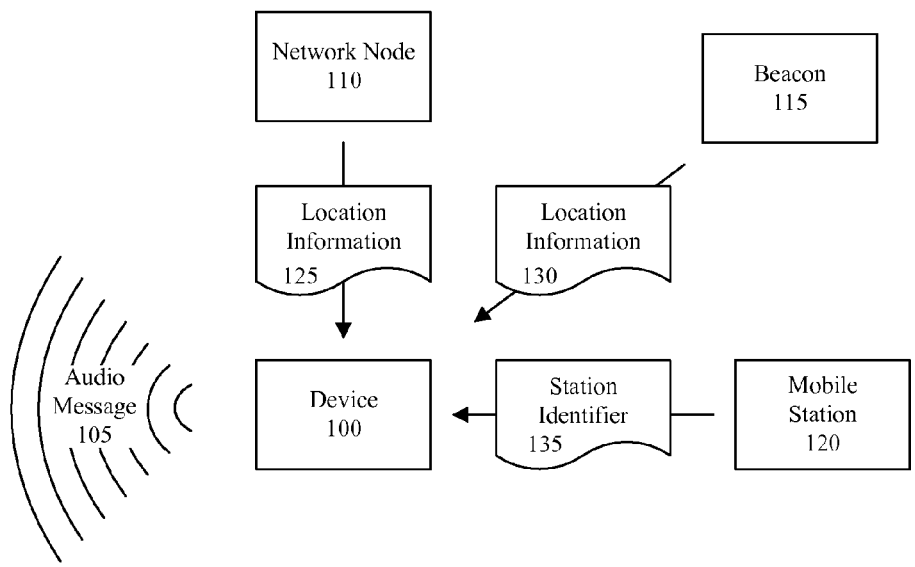
FIG. 1 depicts a device that is useful for understanding the present invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a device for generating an audio message using audio attributes that are selected based on one or more external parameters. As used herein, the term "external parameter" means any parameter that is independent of a user input. For example, detection of a mobile station or beacon can generate an external parameter, whereas a user selection is not an external parameter. Other examples of external parameters can include a time, a date, a location, an identification of others within a personal area network, a stress level of a user, an event, and/or any other parameter that may be detected by the device.

The audio attributes can present different voice personas, for instance a wife, a child, a friend, a girlfriend, a boss, a celebrity, or any other desired persona. Further, the audio attributes also can present background sounds, such as kids playing, paper crumbling, cheering, music, chanting, stomping, etc. For example, if the device comprises a calendaring program, work-related audio messages presented by the calendaring program at 9:00 A.M. on a Monday morning can be presented in a boss' voice. Use of the boss' voice can trigger a primal reaction in the user to focus on work and focus on meeting daily objectives. A message at the end of the workday can be presented in the voice of the user's wife with soothing background music, thereby mentally preparing the user for his return home. Similarly, a child's voice, along with the sound of kids playing in the background, can be presented to prompt a user when the time for soccer practice is approaching, thereby preparing the user for social interaction at soccer practice.

If the user is located at a specific location, for example within a theme park, messages provided by the device can be presented in a voice associated with the theme park. In addition, screams of people on a roller coaster can be presented as background sounds. Use of such audio attributes can enhance the theme park experience. In yet another example, if after a softball game the device detects station identifiers associated with softball friends, a message can be presented in the voice of the user's wife calmly reminding the user to head home. Still, a myriad of other audio attributes presenting voice personas and background sounds can be used and use of such audio attributes can be triggered by any of a myriad of scenarios, and the invention is not limited in this regard.

FIG. 1 depicts a device 100 that is useful for understanding the present invention. The device 100 can be a computer, a mobile station (e.g. a mobile telephone, a mobile computer, a personal digital assistant, a mobile gaming device, etc.), an audio system, or any other system or device suitable for communicating an audio message 105 via an acoustic signal. In particular, the audio message 105 can be an audio message that is generated using the audio attributes selected based on the external parameters.

In an arrangement in which the relevant external parameters comprise location information, the device 100 can determine the location information based on the device's actual position, approximate position, or position relative to another device. For example, the device 100 can receive communication signals from a network node 110, a beacon 115 and/or another mobile station 120. The network node 110 can be an access point, a router, a switch, a base transceiver station (BTS), a repeater, or any other communication device that may provide a communications link between the device 100 and a communications network. The beacon 115 can comprise a transponder that indicates a location of the beacon 115.

In one arrangement, communication signals received from the network node 100 can comprise location information 125. The location information 125 can indicate a location of the network node 110, which may be an adequate approximation of the location of the device 100. The location of the network node 110 can be communicated to the device 100 using a service discovery protocol. In another arrangement, the network node's media access control (MAC) address can be communicated to the device 100. The device 100 then can query a suitable database with the network node's MAC address to determine the location of the network node 110. The beacon 115 also can provide location information 130 to the device 100. For instance, the beacon's transponder can broadcast an identifier that indicates a location of the beacon 115.

In yet another arrangement, the location information can indicate a relative position of the device 100 with respect to another device, such as the mobile station 120. For example, if the device 100 receives a station identifier 135 from the mobile station 120, the device 100 can determine that the mobile station 120 is within the personal area network (PAN) of the device 100.

In yet another aspect of the invention, the actual location of the device 100 can be determined. For example, a global positioning system (GPS) or a local positioning system can be used to determine the device's location.

Figure 2:
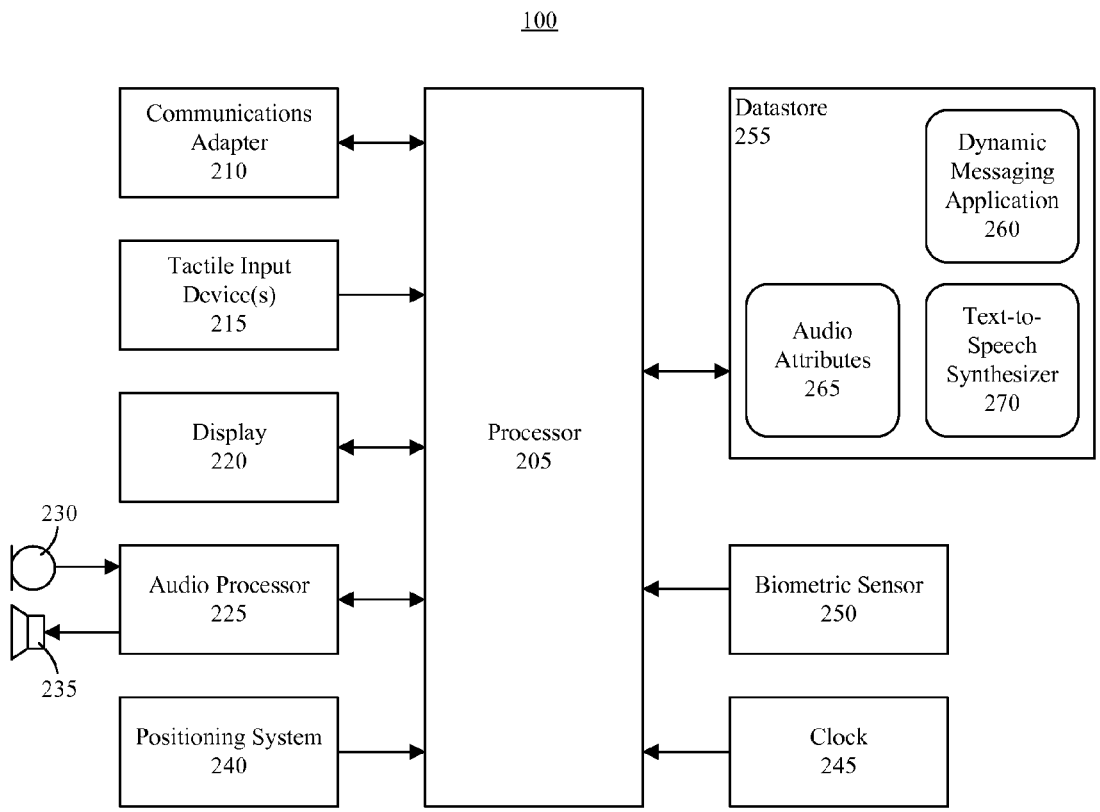
FIG. 2 depicts a block diagram of the device of FIG. 1.

FIG. 2 depicts a block diagram of the device 100 that is useful for understanding the present invention. The device 100 can include a processor 205. The processor can comprise, for example, a central processing unit (CPU), a digital signal processor (DSP), an application specific integrated circuit (ASIC), a programmable logic device (PLD), a plurality of discrete components that cooperate to process data, and/or any other suitable processing device.

The device 100 also can include a communications adapter 210. The communications adapter 210 can include a network adapter suitable for communicating via a communications network, for example via a network node, an access point, a beacon, a router or a switch. For example, the network adapter can include a transceiver that communicates data via wireless communications and/or a communications port or network adapter that communicates via wired communications. The communications adapter 210 also can include a short range wireless communications transceiver, for instance a Bluetooth or Zigbee adapter. Still, the communications adapter 210 can include any other systems or components which support communications between the device 100 and any other devices or systems.

One or more tactile input devices 215 also can be provided. The tactile input devices 215 can comprise one or more buttons, keys, soft keys, sensors, or any other devices suitable for receiving a tactile user input. The device 100 also can include a display 220. In one arrangement the display 220 can comprise a touch screen that can receive tactile inputs and communicate such inputs to the processor 205.

The device 100 further can include an audio processor 225 connected to an input audio transducer 230 (e.g. microphone) and an output audio transducer 235 (e.g. loudspeaker). The audio processor 225 can comprise a vocoder for encoding and decoding speech signals. Vocoders are known to the skilled artisan. The audio processor 225 can be integrated with the processor 205, or provided as a separate component that is communicatively linked to the processor 205. The audio processor 225 can comprise a CPU, a DSP, an ASIC, a PLD, a plurality of discrete components that cooperate to process audio data, and/or any other suitable audio processing device.

A positioning system 240 also can be provided with the device 100. The positioning system 240 can include a global positioning satellite (GPS) receiver, a receiver that detects local positioning signals, a receiver that detects a local transponder, and/or any other suitable position identification system or device. A clock 245 also can be provided to monitor time, including dates, days of the week, months of the year, etc.

In one aspect of the invention, the device 100 also can comprise a one or more biometric sensors 250 that sense biometric parameters of a user, such as a user stress level. An example of the biometric sensor 250 can include a galvanic skin response (GSR) sensor. A GSR sensor can measures skin conduction to ascertain a level of moisture on the skin, which is indicative of a level of stress. Another example of a biometric sensor 250 can include a heart rate sensor. A heart rate sensor can comprise an accelerometer that detects blood pulsing through a hand in contact with the device 100. Yet another example of a biometric sensor 250 can include an oxygen monitoring device that monitors blood flow through an extremity, such as an ear. Such a device can be incorporated into an accessory headset that is worn by a user. A voice analyzer is another example of a biometric sensor 250. A voice analyzer can process detected speech signals to determine stress levels. In another arrangement, the biometric sensor 250 can comprise a pedometer that monitors the stride length of the user. Shorter, faster stride lengths can indicate elevated levels of stress. Still, other biometric sensors can be used with the device 100 and the invention is not limited in this regard.

Further, the device 100 can include a datastore 255. The datastore 255 can include one or more storage devices, each of which can include a magnetic storage medium, an electronic storage medium, an optical storage medium, a magneto-optical storage medium, and/or any other storage medium suitable for storing digital information. In one arrangement, the datastore 255 can be integrated into the processor 205.

A dynamic messaging application 260 can be contained on the datastore 255. The dynamic messaging application 260 can be executed by the processor 205 to implement the methods and processes described herein. For example, the dynamic messaging application 260 can receive an indicator from a calendaring program indicating that a message is to be presented to a user, and receive from the communications adapter 210, the positioning system 240 and/or the clock 245 signals representing external parameters. Based on the external parameters, the dynamic messaging application 260 can select appropriate audio attributes 265 for presenting an audio message.

In one arrangement, the audio attributes 265 can comprise pre-recorded audio files. The audio files can include, for instance, pre-recorded audio files generated from the user's spouse, the user's children, friends, co-workers, celebrities, etc. The audio attributes also can include background sounds, for example of children playing, paper crumbling, cheering, and so on. In one aspect of the invention, selected audio messages can be generated to include one or more background sounds.

Table 1 represents examples of voice personas and background sounds that may be associated with various social groups identified by the dynamic messaging application 260. Such social groups can be identified based on time, location of the device 100, other devices proximate to the device 100 (e.g. within the device user's personal area network), or in any other suitable manner.

TABLE 1

| Social Groups | Voice Personas | Background Sounds |
|---|---|---|
| Family | Wife/Children | Kids Playing |
| Work | Boss/Co-workers | Paper Crumpling |
| Softball | Umpire | Ball being hit, kids cheering |
| Scouts | Scout Master | Hiking/Marching song |
| Church | Pastor | Spiritual chanting |
| Bicycling Club | Members | Pedaling |
| Jogging | Myself | Feet clomping |
| Health Club | My Doctor | Hospital |
| Restaurant | Matradee | People talking, glasses clinging, clinging silverware/dishes clanging |

In another aspect of the invention, the audio attributes 265 can include parameters that are used by a text-to-speech synthesizer 270 for generating audio messages. Parameters can be available for synthesizing any of a variety of available voice personas. For example, the audio attributes 265 can include parameters for generating audio messages in a female voice, a male voice, a child's voice, in the voice of a celebrity or character, or in any other voice. In addition, the audio attributes 265 can include parameters for generating such voices in a variety of different tones, for example in a calming voice, a stern voice, an excited voice, a cheerful voice, a sad voice, etc. Such voice attributes 265 can be updated. For example, if a new movie has been released, voice attributes 265 associated with characters in the movie can be made publicly available for download.

Suitable text selected or generated by the dynamic messaging application 260 can be communicated to the text-to-speech synthesizer 270, which can generate the audio message from such text. The dynamic messaging application 260 also can communicate to the text-to-speech synthesizer 270 a selection of a voice persona to use when generating the audio message. For example, the dynamic messaging application 260 can identify the parameters that are to be used by the text-to-speech synthesizer 270.

Such parameters can be dynamically selected based on the message that is communicated and/or the external parameters that are detected. Further, the parameter selection can be changed by the dynamic messaging application 260 each time a particular message is repeated. For instance, a first reminder for an approaching deadline can be presented in a calm voice. A second reminder for the approaching deadline can be presented in a voice having a tone of concern. A third reminder for the same deadline can be presented in a stem voice, and so on. The dynamic messaging application 260 can interface with a calendaring application to identify message types, the number of messages sent for a particular meeting or task, deadlines, etc. If, however, the dynamic messaging application 260 receives signals from the biometric sensor 250 indicating the user of the device 100 has a particularly high level of stress, the dynamic messaging application 260 can select audio attributes 265 which present messages that are calming to the user.

In another aspect of the invention, the audio attributes 265 can include parameters that are generated from voice samples. For instance, acquaintances of the user may be prompted to utter one or more statements into the audio input transducer 230, and the dynamic messaging application 260 can process such utterances to identify features of the voices which may be represented with the audio parameters. Moreover, such parameters can be exchanged among users. For example, a husband and wife can use their own devices to generate such parameters, and exchange such parameters in a suitable manner, for instance using a communication link between their respective devices or a storage medium to which each of the devices can be communicatively linked.

After the appropriate audio attributes 265 for generating the audio message have been selected and the audio message has been generated, the dynamic messaging application 260 then can cause the audio message to be communicated to the audio processor 225, which can generate the audio message as an acoustic signal via the output audio transducer 235. For example, the dynamic messaging application 260 can receive an audio file generated by the text-to-speech synthesizer 270, combine such audio file with an audio file comprising background sounds, and communicate the combined audio file to the audio processor 225 as the audio message.

Figure 3:
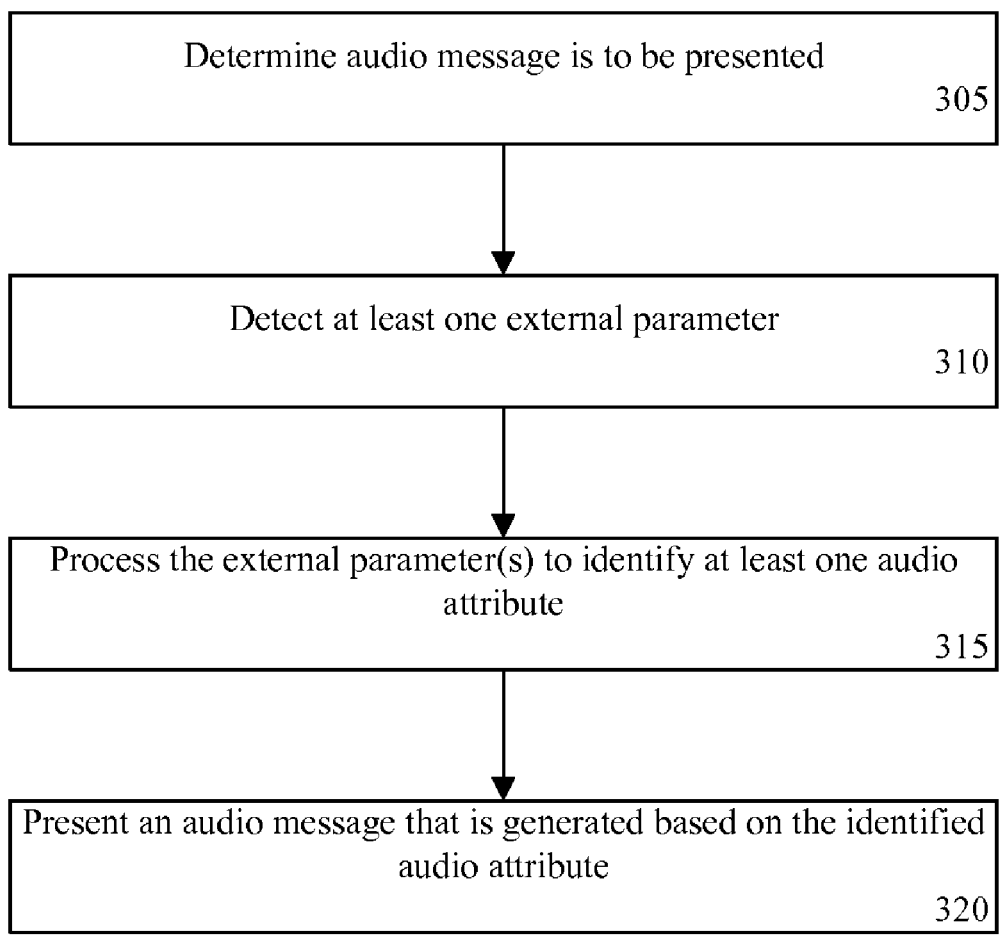
FIG. 3 is a flowchart that is useful for understanding the present invention.

FIG. 3 is a flowchart presenting a method 300 that is useful for understanding the present invention. Beginning at step 305, a determination can be made that an audio message is to be presented. The determination can be made in any suitable manner. For example, as noted, an indicator can be provided from a calendaring program. In a communication device, a determination can be made to present an audio message in response to an incoming call, e-mail, instant message, file transfer, etc. Still, such determination can be made in any other suitable manner and the invention is not limited in this regard.

At step 310, at least one external parameter can be detected. The external parameter can be a time of day, a day of the week, a month or a year. The external parameter also can include location information, such as a present location the device in which the method 300 is implemented, or a location of a mobile station communicatively linked to such device. The external parameter also can include a station identifier received from a mobile station within a personal area network of a user. Further, the external parameter can include a biometric parameter. Nonetheless, a myriad of other external parameters can be detected and the invention is not limited in this regard.

Proceeding to step 315, the external parameter(s) can be processed to identify at least one audio attribute. As noted, such audio attributes can include one or more audio files, or one or more parameters that may be processed by a text-to-speech application to generate the audio message in a particular voice persona.

Continuing to step 320, an audio message that is based on the identified audio attribute(s) can be presented. For example, if the external parameters indicate that it is lunch time, the audio message can be presented in the voice of a famous chef indicating it is time to eat.

The present invention can be realized in hardware, software, or a combination of hardware and software. The present invention can be realized in a centralized fashion in one processing system or in a distributed fashion where different elements are spread across several interconnected processing systems. Any kind of processing system or other device adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method for providing an audio message, comprising:
   detecting at least one biometric parameter of a user, wherein the biometric parameter is an external parameter that is independent of a user input;
   processing the biometric parameter to identify at least one audio attribute selected to affect a present condition of the user; and
   presenting an audio message generated based, at least in part, on the audio attribute.

2. The method of claim 1, wherein identifying the audio attribute comprises identifying at least a second audio attribute associated with a background sound.

3. The method of claim 1, further comprising receiving an audio message indicator from a calendaring program.

4. The method of claim 1, further comprising:
   detecting a time; and
   identifying the audio attribute based at least in part on the time.

5. The method of claim 1, further comprising:
   detecting a location; and
   identifying the audio attribute based at least in part on the location.

6. The method of claim 5, wherein detecting the location comprises receiving a signal from a network node or a beacon.

7. The method of claim 5, wherein detecting the location comprises receiving location information from a positioning system.

8. The method of claim 1, further comprising:
   detecting a station identifier; and
   identifying the audio attribute based at least in part on the station identifier.

9. A device for providing an audio message, comprising:
   a biometric sensor that detects at least one biometric parameter of a user, wherein the biometric parameter is an external parameter that is independent of a user input;
   a processor that processes the biometric parameter to identify at least one audio attribute selected to affect a present condition of the user; and
   an output audio transducer that presents an audio message generated based, at least in part, on the audio attribute.

10. The device of claim 9, wherein the processor identifies at least a second audio attribute associated with a background sound.

11. The device of claim 9, wherein the processor receives an audio message indicator from a calendaring program.

12. The device of claim 9, further comprising a positioning system that detects at least a second parameter, the second parameter being an external parameter.

13. The device of claim 12, further comprising a communications adapter that detects at least the second parameter from a network node, a beacon or a mobile station.

14. A machine readable storage, having stored thereon a computer program having a plurality of code sections comprising:
   code for detecting at least one biometric parameter of a user, wherein the biometric parameter is an external parameter that is independent of a user input;
   code for processing the biometric parameter to identify at least one audio attribute selected to affect a present condition of the user; and
   code for presenting an audio message generated based, at least in part, on the audio attribute.

15. The machine readable storage of claim 14, wherein the code for identifying the audio attribute comprises code for identifying at least a second audio attribute associated with a background sound.

16. The machine readable storage of claim 14, further comprising code for detecting a time, a location or a station identifier.

17. The machine readable storage of claim 14, further comprising code for detecting at least a second parameter, second parameter selected from the group consisting of a time, a location and a station identifier.

* * * * *